US012753080B2

(12) United States Patent
Zhu et al.

(10) Patent No.: US 12,753,080 B2
(45) Date of Patent: Oct. 6, 2026

(54) SYSTEM FOR PREPARING ISOTOPE-LABELED CARBON DIOXIDE AND METHOD THEREFOR

(71) Applicant: Institute of Process Engineering, Chinese Academy of Sciences, Beijing (CN)

(72) Inventors: Tingyu Zhu, Beijing (CN); Xiaolong Liu, Beijing (CN); Yang Zou, Beijing (CN)

(73) Assignee: INSTITUTE OF PROCESS ENGINEERING, CHINESE ACADEMY OF SCIENCES, Beijing (CN)

( * ) Notice: Subject to any disclaimer, the term of this patent is extended or adjusted under 35 U.S.C. 154(b) by 294 days.

(21) Appl. No.: 18/616,778

(22) Filed: Mar. 26, 2024

(65) Prior Publication Data

US 2024/0239665 A1 Jul. 18, 2024

(30) Foreign Application Priority Data

Dec. 1, 2023 (CN) ........................ 202311640673.9

(51) Int. Cl.
*C01B 32/50* (2017.01)
*B01D 53/00* (2006.01)
(Continued)

(52) U.S. Cl.
CPC ............ *C01B 32/50* (2017.08); *B01D 53/002* (2013.01); *B01J 19/0013* (2013.01);
(Continued)

(58) Field of Classification Search
None
See application file for complete search history.

(56) References Cited

U.S. PATENT DOCUMENTS 4,221,774 A * 9/1980 Spevack ................ B01D 59/33 423/580.2
2019/0241438 A1* 8/2019 Fukuda ................... C01B 32/40

FOREIGN PATENT DOCUMENTS

CN 109540621 3/2019
CN 110117014 8/2019
(Continued)

OTHER PUBLICATIONS

Machine Translation for JP 2004300021 (Year: 2004).*
(Continued)

*Primary Examiner* — Michael Forrest
(74) *Attorney, Agent, or Firm* — Woodard, Emhardt, Henry, Reeves & Wagner, LLP

(57) ABSTRACT

Provided are a system for preparing isotope-labeled carbon dioxide and a method therefor. The preparation method comprises: vaporizing heavy-oxygen water and mixing the heavy-oxygen water with carbon dioxide, and subjecting the heavy-oxygen water and the carbon dioxide to an oxygen-exchange reaction by catalyzing them with a catalytic material, and performing gas-liquid separation after the reaction to obtain the isotope-labeled carbon dioxide. The system provided by the present application has a simple structure, and by adopting the heavy-oxygen water which has a wide source and low cost as an oxygen isotope source and utilizing the oxygen-exchange reaction, the replacement of oxygen-16 in normal carbon dioxide by oxygen-18 in heavy-oxygen water is achieved to obtain the oxygen-18 labeled carbon dioxide product. The process is simple and pollution-free, the utilization rate of oxygen isotope is high, the conditions of separation and purification are mild, and the system has good economic benefits and application prospects.

8 Claims, 1 Drawing Sheet

(51) Int. Cl.
*B01J 19/00* (2006.01)
*B01J 19/24* (2006.01)
*B01J 21/04* (2006.01)

(52) U.S. Cl.
CPC ........... *B01J 19/2445* (2013.01); *B01J 21/04* (2013.01); *B01J 2219/00103* (2013.01); *C01P 2006/88* (2013.01)

(56) References Cited

FOREIGN PATENT DOCUMENTS

| | | | | | | |
|---|---|---|---|---|---|---|
| CN | 111268678 | | | 6/2020 | | |
| CN | 112037958 | | | 12/2020 | | |
| CN | 114436260 | | | 5/2022 | | |
| JP | H01262463 | | | 10/1989 | | |
| JP | 2004300021 | A | * | 10/2004 | | |
| JP | 2019137569 | | | 8/2019 | | |
| JP | 2021011414 | | | 2/2021 | | |
| JP | 2022056613 | | | 4/2022 | | |
| RU | 2375107 | | | 12/2009 | | |
| RU | 186241 | | | 1/2019 | | |
| RU | 186241 | U1 | * | 1/2019 | ............... | C01B 4/00 |

OTHER PUBLICATIONS

Machine Translation for RU 186241 (Year: 2019).*
Office Action in related CN202311640473.9 mailed Sep. 30, 2025.
Office Action in related JP2024065995 mailed Apr. 1, 2025.

* cited by examiner

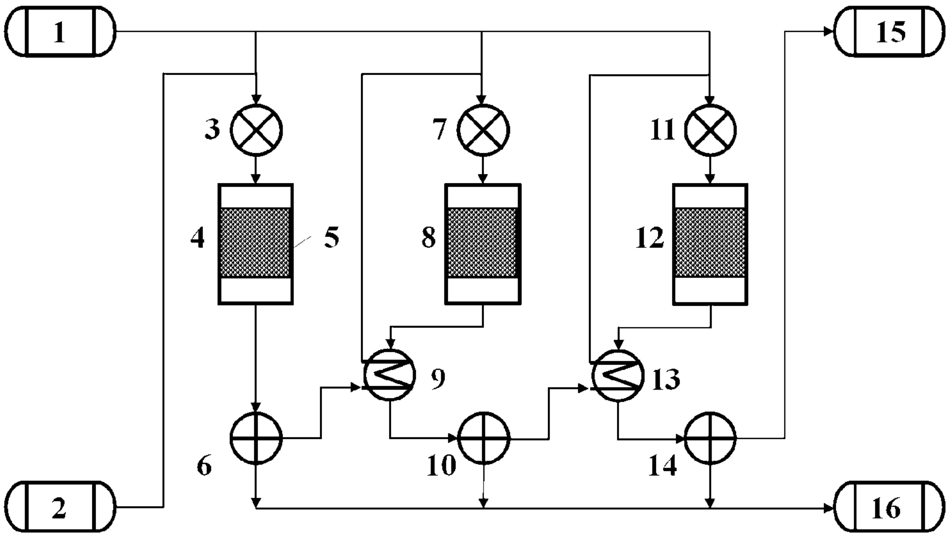
1
2
3
4
5
6
7
8
9
10
11
12
13
14
15
16

SYSTEM FOR PREPARING ISOTOPE-LABELED CARBON DIOXIDE AND METHOD THEREFOR

CROSS-REFERENCE TO RELATED APPLICATION(S)

This application claims priority to Chinese Patent Application No. 202311640673.9 filed Dec. 1, 2023, the disclosure of which is incorporated herein by reference in its entirety.

TECHNICAL FIELD

The present application belongs to the technical field of carbon dioxide preparation, and specifically relates to a system for preparing isotope-labeled carbon dioxide and a method therefor.

BACKGROUND

Under the background of "carbon peak and carbon neutrality", the related scientific researches on the capture, conversion, and utilization of carbon dioxide have become recognized research hotspots. During the conversion reaction of carbon dioxide, the isotope tracking experiment is an important method to study the conversion pathway and reaction mechanism of $CO_2$, and carbon dioxide labeled with oxygen isotope is the main material for the isotope experiment. However, the carbon dioxide labeled with oxygen isotope has a high price due to its complex preparation, separation, and purification processes, which limits the application of the carbon dioxide labeled with oxygen isotope in related research fields.

CN114436260A discloses a device and a method for preparing carbon monoxide and carbon dioxide labeled with oxygen isotope. Oxalic acid labeled with oxygen isotope is decomposed by heating in a reactor to obtain $CO_2$, CO, and $H_2O$ labeled with oxygen isotope, and then the $CO_2$, CO, and $H_2O$ labeled with oxygen isotope are collected separately at different temperatures through a collection bottle and a freezing device. In this method, the preparation process, separation, and purification of the product are simple and efficient, the utilization rate of the oxygen isotope is high, and the carbon dioxide product with an 0-18 abundance of more than 95% can be obtained. However, in this method, oxalic acid labeled with oxygen isotope used as an isotope source is expensive, the condition of separation and purification is harsh, and the freezing temperature are required to be less than or equal to −100° C.

Therefore, it is of great significance to develop a simple, environmental-friendly, efficient and low-cost system for preparing oxygen-18 labeled carbon dioxide and a method therefor to meet the application needs of related research fields.

SUMMARY

An object of the present application is to provide a system for preparing isotope-labeled carbon dioxide and a method therefor, which have widely available and low-cost raw materials, mild preparation conditions, simple process, and good economic benefits and application prospects.

To achieve the above object, the present application adopts the following technical solutions.

In a first aspect, the present application provides a system for preparing isotope-labeled carbon dioxide, and the system comprises: a preparation unit, a raw material storage device for heavy-oxygen water, a raw material storage device for carbon dioxide, a product storage device, and a recovery and storage device for heavy-oxygen water;

the preparation unit comprises a heating vaporization device, an oxygen-exchange reaction device, and a gas-liquid separation device which are connected in sequence, and a catalytic material is arranged in the oxygen-exchange reaction device;

an inlet of the heating vaporization device is connected to the raw material storage device for heavy-oxygen water and the raw material storage device for carbon dioxide, respectively;

a gas-phase outlet of the gas-liquid separation device is connected to the product storage device, and a liquid-phase outlet of the gas-liquid separation device is connected to the recovery and storage device for heavy-oxygen water.

The system provided by the present application has a simple structure; by adopting the heavy-oxygen water which has a wide source and low cost as an oxygen isotope source and utilizing the oxygen-exchange reaction, the replacement of oxygen-16 in normal carbon dioxide by oxygen-18 in heavy-oxygen water is achieved to obtain the oxygen-18 labeled carbon dioxide product. The process is simple and pollution-free, the utilization rate of oxygen isotope is high, the conditions of separation and purification are mild, and the system has good economic benefits and application prospects.

Preferably, the system comprises at least one preparation unit.

For the system provided by the present application, the preparation unit can be flexibly set up according to the purity requirements of the product, and the setting of the preparation unit is convenient and satisfies the needs of different products.

Preferably, in a case where the system comprises two or more preparation units, an inlet of the heating vaporization device of a next preparation unit is respectively connected to the raw material storage device for heavy-oxygen water and the gas-phase outlet of the gas-liquid separation device of a previous preparation unit along the flow direction of materials in the system.

Preferably, in a case where the system comprises two or more preparation units, a heat-exchange device is further arranged between two adjacent preparation units;

a hot-medium inlet of the heat-exchange device is connected to an outlet of the oxygen-exchange reaction device of a next preparation unit along the flow direction of materials in the system;

a cold-medium inlet of the heat-exchange device is connected to a gas-phase outlet of the gas-liquid separation device of a previous preparation unit;

a hot-medium outlet of the heat-exchange device is connected to an inlet of the gas-liquid separation device of a next preparation unit;

a cold-medium outlet of the heat-exchange device is connected to an inlet of the heating vaporization device of a next preparation unit.

Preferably, the catalytic material comprises any one or a combination of at least two of $\gamma$-$Al_2O_3$, $CeO_2$, or anatase titanium dioxide, and typical but non-limiting combinations comprise a combination of $\gamma$-$Al_2O_3$ and $CeO_2$, a combination of $CeO_2$ and anatase titanium dioxide, a combination of $\gamma$-$Al_2O_3$ and anatase titanium dioxide, or a combination of $\gamma$-$Al_2O_3$, $CeO_2$, and anatase titanium dioxide.

In a second aspect, the present application provides a preparation method for isotope-labeled carbon dioxide, and the preparation method adopts the system according to the first aspect.

Preferably, the preparation method comprises the following steps:

(1) vaporizing heavy-oxygen water, and then mixing the heavy-oxygen water with carbon dioxide to obtain a mixed gas;

(2) catalyzing the mixed gas obtained in step (1) with a catalytic material to subject the heavy-oxygen water and the carbon dioxide to an oxygen-exchange reaction, wherein the $^{16}O$ in the carbon dioxide is replaced by $^{18}O$ in the heavy-oxygen water to generate isotope-labeled carbon dioxide, and the $^{18}O$ in the heavy-oxygen water is replaced by $^{16}O$; and (3) liquefying the heavy-oxygen water after the reaction, and subjecting the same and the carbon dioxide after the reaction to gas-liquid separation to obtain the isotope-labeled carbon dioxide.

Preferably, a molar ratio of the heavy-oxygen water to the carbon dioxide in step (1) is (2-5):1, which can be, for example, 2:1, 2.5:1, 3:1, 3.5:1, 4:1, 4.5:1, or 5:1; however, the molar ratio is not limited to the listed values, and other unlisted values within the numerical range are also applicable.

Preferably, the vaporization in step (1) is performed at a temperature of 100-300° C., which can be, for example, 100° C., 120° C., 140° C., 150° C., 160° C., 180° C., 200° C., 220° C., 240° C., 250° C., 260° C., 280° C., or 300° C.; however, the temperature is not limited to the listed values, and other unlisted values within the numerical range are also applicable.

Preferably, the oxygen-exchange reaction in step (2) is performed at a volumetric space velocity of 5000-100000 $h^{-1}$, which can be, for example, 5000 $h^{-1}$, 10000 $h^{-1}$, 15000 $h^{-1}$, 20000 $h^{-1}$, 30000 $h^{-1}$, 40000 $h^{-1}$, 500000 $h^{-1}$, 60000 $h^{-1}$, 70000 $h^{-1}$, 80000 $h^{-1}$, 90000 $h^{-1}$, or 100000 $h^{-1}$; however, the volumetric space velocity is not limited to the listed values, and other unlisted values within the numerical range are also applicable.

Preferably, the liquefaction in step (3) is performed at a temperature of −10° C. to 20° C., which can be, for example, −10° C., −5° C., 0° C., 5° C., 10° C., 15° C., or 20° C.; however, the temperature is not limited to the listed values, and other unlisted values within the numerical range are also applicable.

Compared with the prior art, the present application has the following beneficial effects.

The system provided by the present application has a simple structure; by adopting the heavy-oxygen water which has a wide source and low cost as an oxygen isotope source and utilizing the oxygen-exchange reaction, the replacement of oxygen-16 in normal carbon dioxide by oxygen-18 in heavy-oxygen water is achieved to obtain the oxygen-18 labeled carbon dioxide produce. The process is simple and pollution-free, the utilization rate of oxygen isotope is high, the conditions of separation and purification are mild, and the system has good economic benefits and application prospects.

BRIEF DESCRIPTION OF DRAWINGS

FIG. 1 is a system for preparing isotope-labeled carbon dioxide provided in Example 1.

Reference List: 1—raw material storage device for heavy-oxygen water; 2—raw material storage device for carbon dioxide; 3—primary heating vaporization device; 4—primary oxygen-exchange reaction device; 5—catalytic material; 6—primary gas-liquid separation device; 7—secondary heating vaporization device; 8—secondary oxygen-exchange reaction device; 9—heat-exchange device; 10—secondary gas-liquid separation device; 11—tertiary heating vaporization device; 12—tertiary oxygen-exchange reaction device; 13—heat-exchange device; 14—tertiary gas-liquid separation device; 15—product storage device; and 16—recovery and storage device for heavy-oxygen water.

DETAILED DESCRIPTION

The technical solutions of the present application are further illustrated via embodiments. It should be understood by those skilled in the field that the examples are merely used for understanding the present application and should not be regarded as a specific limitation to the present application.

Example 1

The example provides a system for preparing isotope-labeled carbon dioxide, as shown in FIG. 1, and the system comprises: a primary preparation unit, a secondary preparation unit, a tertiary preparation unit, a raw material storage device for heavy-oxygen water 1, a raw material storage device for carbon dioxide 2, a product storage device 15, and a recovery and storage device for heavy-oxygen water 16, a heat-exchange device 9, and a heat-exchange device 13;

the primary preparation unit comprises a primary heating vaporization device 3, a primary oxygen-exchange reaction device 4, and a primary gas-liquid separation device 6 which are connected in sequence;

the secondary preparation unit comprises a secondary heating vaporization device 7, a secondary oxygen-exchange reaction device 8, and a secondary gas-liquid separation device 10, and the secondary heating vaporization device 7 is connected to the secondary oxygen-exchange reaction device 8;

the tertiary preparation unit comprises a tertiary heating vaporization device 11, a tertiary oxygen-exchange reaction device 12, and a tertiary gas-liquid separation device 14, and the tertiary heating vaporization device 11 is connected to the tertiary oxygen-exchange reaction device 12;

the primary oxygen-exchange reaction device 4, the secondary oxygen-exchange reaction device 8, and the tertiary oxygen-exchange reaction device 12 are all provided with a catalytic material 5, and the catalytic material 5 is 7-$Al_2O_3$;

the raw material storage device for heavy-oxygen water 1 is connected to the primary heating vaporization device 3, the secondary heating vaporization device 7, and the tertiary heating vaporization device 11, respectively;

the raw material storage device for carbon dioxide 2 is connected to the primary heating vaporization device 3;

a cold-medium inlet of the heat-exchange device 9 is connected to a gas-phase outlet of the primary gas-liquid separation device 6; a hot-medium inlet of the heat-exchange device 9 is connected to the secondary oxygen-exchange reaction device 8; a hot-medium outlet of the heat-exchange device 9 is connected to the secondary gas-liquid separation device 10; and a cold-medium outlet of the heat-exchange device 9 is connected to the secondary heating vaporization device 7;

a cold-medium inlet of the heat-exchange device 13 is connected to a gas-phase outlet of the secondary gas-liquid separation device 10; a hot-medium inlet of the heat-exchange device 13 is connected to the tertiary oxygen-exchange reaction device 12, a hot-medium outlet of the heat-exchange device 13 is connected to the tertiary gas-liquid separation device 14, and a cold-medium outlet of the heat-exchange device 13 is connected to the tertiary heating vaporization device 11;

the product storage device 15 is connected to a gas-phase outlet of the tertiary gas-liquid separation device 14;

the recovery and storage device for heavy-oxygen water 16 is connected to liquid-phase outlets of the primary gas-liquid separation device 6, the secondary gas-liquid separation device 10, and the tertiary gas-liquid separation device 14, respectively.

Example 2

The example provides a system for preparing isotope-labeled carbon dioxide, and the system comprises: a primary preparation unit, a secondary preparation unit, a raw material storage device for heavy-oxygen water 1, a raw material storage device for carbon dioxide 2, a product storage device 15, and a recovery and storage device for heavy-oxygen water 16, and a heat-exchange device 9;

the primary preparation unit comprises a primary heating vaporization device 3, a primary oxygen-exchange reaction device 4, and a primary gas-liquid separation device 6 which are connected in sequence;

the secondary preparation unit comprises a secondary heating vaporization device 7, a secondary oxygen-exchange reaction device 8, and a secondary gas-liquid separation device 10, and the secondary heating vaporization device 7 is connected to the secondary oxygen-exchange reaction device 8;

the primary oxygen-exchange reaction device 4 and the secondary oxygen-exchange reaction device 8 are both provided with a catalytic material 5, and the catalytic material 5 is $\gamma$-$Al_2O_3$;

the raw material storage device for heavy-oxygen water 1 is connected to the primary heating vaporization device 3 and the secondary heating vaporization device 7, respectively;

the raw material storage device for carbon dioxide 2 is connected to the primary heating vaporization device 3;

a cold-medium inlet of the heat-exchange device 9 is connected to a gas-phase outlet of the primary gas-liquid separation device 6; a hot-medium inlet of the heat-exchange device 9 is connected to the secondary oxygen-exchange reaction device 8; a hot-medium outlet of the heat-exchange device 9 is connected to the secondary gas-liquid separation device 10; a cold-medium outlet of the heat-exchange device 9 is connected to the secondary heating vaporization device 7;

the product storage device 15 is connected to a gas-phase outlet of the secondary gas-liquid separation device 10;

the recovery and storage device for heavy-oxygen water 16 is connected to liquid-phase outlets of the primary gas-liquid separation device 6 and the secondary gas-liquid separation device 10, respectively.

Application Example 1

This application example provides a preparation method for isotope-labeled carbon dioxide. In the preparation method, the system provided in Example 1 was used, and the preparation method comprises the following steps:

(1) heavy-oxygen water ($H_2{}^{18}O$ in liquid form) provided by a raw material storage device for heavy-oxygen water 1 was passed into a primary heating vaporization device 3, then the heavy-oxygen water was vaporized into a gas phase, carbon dioxide ($CO_2$) was provided by a raw material storage device for carbon dioxide 2, and the gas-phase heavy-oxygen water was mixed with the carbon dioxide, wherein the molar ratio of the heavy-oxygen water and the carbon dioxide was 3:1, and a temperature of the mixed gas at an outlet of the primary heating vaporization device 3 was 120° C.;

(2) the mixed gas of $H_2{}^{18}O$ and $CO_2$ were introduced into a primary oxygen-exchange reaction device 4, wherein a reaction temperature of the primary oxygen-exchange reaction device 4 was 110° C., and a volumetric space velocity was 10000 $h^{-1}$; and under the action of the catalytic material $\gamma$-$Al_2O_3$, $H_2{}^{18}O$ was decomposed, and reacted with $CO_2$ adsorbed on the material for oxygen exchange, where $^{16}O$ in the $CO_2$ was replaced by $^{18}O$ in the $H_2{}^{18}O$ to generate oxygen-18 labeled carbon dioxide ($C^{18}O^{16}O$ and $C^{18}O^{18}O$), and $^{18}O$ in the $H_2{}^{18}O$ was replaced by $^{16}O$ to generate $H_2{}^{16}O$;

(3) the gas after the oxygen-exchange reaction was cooled in a gas-liquid separation device 6 at a cooling temperature of −3° C., and a separated liquid-phase water ($H_2{}^{18}O$ and $H_2{}^{16}O$) entered a recovery and storage device for heavy-oxygen water 16, and a separated gas-phase carbon dioxide ($C^{16}O^{16}O$, $C^{18}O^{16}O$, and $C^{18}O^{18}O$) was heated to 80° C. by a heat-exchange device 9; and (4) the gas-phase carbon dioxide ($C^{16}O^{16}O$, $C^{18}O^{16}O$, and $C^{18}O^{18}O$) after a primary oxygen-exchange reaction and the heavy-oxygen water were sequentially subjected to a secondary preparation unit and a tertiary preparation unit to perform the same vaporization, oxygen-exchange reaction, and gas-liquid separation as steps (1) to (3), and the obtained isotope-labeled carbon dioxide product entered a product storage device 15.

In this application example, a proportion of $C^{18}O^{18}O$ in $CO_2$ at a gas-phase outlet of the primary gas-liquid separation device 6 was 52%, a proportion of $C^{18}O^{18}O$ in $CO_2$ at a gas-phase outlet of the secondary gas-liquid separation device 10 was 84%, and a proportion of $C^{18}O^{18}O$ in $CO_2$ at a gas-phase outlet of the tertiary gas-liquid separation device 14 was 98%.

Application Example 2

This application example provides a preparation method for isotope-labeled carbon dioxide. In the preparation method, the system provided in Example 1 was used, and the preparation method comprises the following steps:

(1) heavy-oxygen water ($H_2{}^{18}O$ in liquid form) provided by a raw material storage device for heavy-oxygen water 1 was passed into a primary heating vaporization device 3, the heavy-oxygen water was vaporized into a gas phase, carbon dioxide ($CO_2$) was provided by a raw material storage device for carbon dioxide 2, and the gas phase heavy-oxygen water was mixed with the carbon dioxide, wherein the molar ratio of the heavy-oxygen water and the carbon dioxide was 2:1, and a temperature of the mixed gas at an outlet of the primary heating vaporization device 3 was 100° C.;

(2) the mixed gas of $H_2{}^{18}O$ and $CO_2$ were introduced into a primary oxygen-exchange reaction device 4, wherein a reaction temperature of the primary oxygen-exchange reaction device 4 was 110° C., and a volumetric space velocity was 5000 $h^{-1}$; and under the action of the catalytic material γ-$Al_2O_3$, $H_2{}^{18}O$ was decomposed, and reacted with $CO_2$ adsorbed on the material for oxygen exchange, where $^{16}O$ in the $CO_2$ was replaced by $^{18}O$ in the $H_2{}^{18}O$ to generate oxygen-18 labeled carbon dioxide ($C^{18}O^{16}O$ and $C^{18}O^{18}O$), and $^{18}O$ in the $H_2{}^{18}O$ was replaced by $^{16}O$ to generate $H_2{}^{16}O$;

(3) the gas after the oxygen-exchange reaction was cooled in a gas-liquid separation device 6 at a cooling temperature of −10° C., and a separated liquid phase water ($H_2{}^{18}O$ and $H_2{}^{16}O$) entered a recovery and storage device for heavy-oxygen water 16, and a separated gas phase carbon dioxide ($C^{16}O^{16}O$, $C^{18}O^{16}O$, and $C^{18}O^{18}O$) was heated to 80° C. by a heat-exchange device 9; and (4) the gas phase carbon dioxide ($C^{16}O^{16}O$, $C^{18}O^{16}O$, and $C^{18}O^{18}O$) after a primary oxygen-exchange reaction and the heavy-oxygen water were sequentially subjected to a secondary preparation unit and a tertiary preparation unit to perform the same vaporization, oxygen-exchange reaction, and gas-liquid separation as steps (1) to (3), and the obtained isotope-labeled carbon dioxide product entered a product storage device 15.

In this application example, a proportion of $C^{18}O^{18}O$ in $CO_2$ at a gas-phase outlet of the primary gas-liquid separation device 6 was 45%, a proportion of $C^{18}O^{18}O$ in $CO_2$ at a gas-phase outlet of the secondary gas-liquid separation device 10 was 72%, and a proportion of $C^{18}O^{18}O$ in $CO_2$ at a gas-phase outlet of the tertiary gas-liquid separation device 14 was 88%.

Application Example 3

This application example provides a preparation method for isotope-labeled carbon dioxide. In the preparation method, the system provided in Example 1 was used, and the preparation method comprises the following steps:

(1) heavy-oxygen water ($H_2{}^{18}O$ in liquid form) provided by a raw material storage device for heavy-oxygen water 1 was passed into a primary heating vaporization device 3, the heavy-oxygen water was vaporized into a gas phase, carbon dioxide ($CO_2$) was provided by a raw material storage device for carbon dioxide 2, and the gas phase heavy-oxygen water was mixed with the carbon dioxide, wherein the molar ratio of the heavy-oxygen water and the carbon dioxide was 5:1, and a temperature of the mixed gas at an outlet of the primary heating vaporization device 3 was 300° C.;

(2) the mixed gas of $H_2{}^{18}O$ and $CO_2$ were introduced into a primary oxygen-exchange reaction device 4, wherein a reaction temperature of the primary oxygen-exchange reaction device 4 was 110° C., and a volumetric space velocity was 100000 $h^{-1}$; and under the action of the catalytic material γ-$Al_2O_3$, $H_2{}^{18}O$ was decomposed, and reacted with $CO_2$ adsorbed on the material for oxygen exchange, where $^{16}O$ in the $CO_2$ was replaced by $^{18}O$ in the $H_2{}^{18}O$ to generate oxygen-18 labeled carbon dioxide ($C^{18}O^{16}O$ and $C^{18}O^{18}O$), and $^{18}O$ in the $H_2{}^{18}O$ was replaced by $^{16}O$ to generate $H_2{}^{16}O$;

(3) the gas after the oxygen-exchange reaction was cooled in a gas-liquid separation device 6 at a cooling temperature of 20° C., and a separated liquid phase water ($H_2{}^{18}O$ and $H_2{}^{16}O$) entered a recovery and storage device for heavy-oxygen water 16, and a separated gas phase carbon dioxide ($C^{16}O^{16}O$, $C^{18}O^{16}O$, and $C^{18}O^{18}O$) was heated to 80° C. by a heat-exchange device 9; and (4) the gas phase carbon dioxide ($C^{16}O^{16}O$, $C^{18}O^{16}O$, and $C^{18}O^{18}O$) after a primary oxygen-exchange reaction and the heavy-oxygen water were sequentially subjected to a secondary preparation unit and a tertiary preparation unit to perform the same vaporization, oxygen-exchange reaction, and gas-liquid separation as steps (1) to (3), and the obtained isotope-labeled carbon dioxide product entered a product storage device 15.

In this application example, a proportion of $C^{18}O^{18}O$ in $CO_2$ at a gas-phase outlet of the primary gas-liquid separation device 6 was 64%, a proportion of $C^{18}O^{18}O$ in $CO_2$ at a gas-phase outlet of the secondary gas-liquid separation device 10 was 87%, and a proportion of $C^{18}O^{18}O$ in $CO_2$ at a gas-phase outlet of the tertiary gas-liquid separation device 14 was 99%.

Application Example 4

This application example provides a preparation method for isotope-labeled carbon dioxide. In the preparation method, the system provided in Example 1 was used. This application example differs from Application Example 1 in that the molar ratio of the heavy-oxygen water to the carbon dioxide in the primary heating vaporization device 3, the secondary heating vaporization device 7, and the tertiary heating vaporization device are 2:1, 3:1, and 4:1, respectively, and the rest are the same as in Application Example 1.

In this application example, a proportion of $C^{18}O^{18}O$ in $CO_2$ at a gas-phase outlet of the primary gas-liquid separation device 6 was 40%, a proportion of $C^{18}O^{18}O$ in $CO_2$ at a gas-phase outlet of the secondary gas-liquid separation device 10 was 75%, and a proportion of $C^{18}O^{18}O$ in $CO_2$ at a gas-phase outlet of the tertiary gas-liquid separation device 14 was 96%.

Application Example 5

This application example provides a preparation method for isotope-labeled carbon dioxide. In the preparation method, the system provided in Example 1 was used. This application example differs from Application Example 1 in that the catalytic material in the primary oxygen-exchange reaction device 4, the secondary oxygen-exchange reaction device 8, and the tertiary oxygen-exchange reaction device 12 are replaced by $CeO_2$ with an equal amount.

In this application example, a proportion of $C^{18}O^{18}O$ in $CO_2$ at a gas-phase outlet of the primary gas-liquid separation device 6 was 50%, a proportion of $C^{18}O^{18}O$ in $CO_2$ at a gas-phase outlet of the secondary gas-liquid separation device 10 was 82%, and a proportion of $C^{18}O^{18}O$ in $CO_2$ at a gas-phase outlet of the tertiary gas-liquid separation device 14 was 95%.

Application Example 6

This application example provides a preparation method for isotope-labeled carbon dioxide. In the preparation method, the system provided in Example 1 was used. This application example differs from Application Example 1 in that the catalytic material in the primary oxygen-exchange reaction device 4, the secondary oxygen-exchange reaction device 8, and the tertiary oxygen-exchange reaction device 12 are replaced by anatase titanium dioxide with an equal amount.

In this application example, a proportion of $C^{18}O^{18}O$ in $CO_2$ at a gas-phase outlet of the primary gas-liquid separation device 6 was 48%, a proportion of $C^{18}O^{18}O$ in $CO_2$ at a gas-phase outlet of the secondary gas-liquid separation device 10 was 78%, and a proportion of $C^{18}O^{18}O$ in $CO_2$ at a gas-phase outlet of the tertiary gas-liquid separation device 14 was 90%.

Comparative Application Example 1

This comparative application example provides a preparation method for isotope-labeled carbon dioxide. In the preparation method, the system provided in Example 1 was used. This comparative application example differs from Application Example 1 in that no catalytic material is arranged in the primary oxygen-exchange reaction device 4, the secondary oxygen-exchange reaction device 8, or the tertiary oxygen-exchange reaction device 12.

In this comparative application example, no catalytic material is arranged in the oxygen-exchange reaction devices, heavy-oxygen water cannot undergo the oxygen-exchange reaction with $CO_2$, and the oxygen in $CO_2$ is not replaced by O-18.

TABLE 1

| | Proportion of $C^{18}O^{18}O$ in product (%) | | | Utilization rate of heavy-oxygen water (%) |
|---|---|---|---|---|
| | Primary oxygen exchange | Secondary oxygen exchange | Tertiary oxygen exchange | |
| Application Example 1 | 52 | 84 | 98 | 90 |
| Application Example 2 | 45 | 72 | 88 | 93 |
| Application Example 3 | 64 | 87 | 99 | 84 |
| Application Example 4 | 40 | 75 | 96 | 86 |
| Application Example 5 | 50 | 82 | 95 | 86 |
| Application Example 6 | 48 | 78 | 90 | 85 |
| Comparative Application Example 1 | 0 | 0 | 0 | 0 |

As can be seen from Table 1, based on the system and the method provided by the present application, the preparation of the isotope-labeled carbon dioxide can be realized by oxygen exchange with heavy-oxygen water; the concentration of $C^{18}O_2$ after the secondary oxygen exchange can reach more than or equal to 72%; after the tertiary oxygen exchange, the concentration of $C^{18}O_2$ can increase to more than or equal to 88%, the reaction efficiency is high, and the preparation purity is high; the utilization rate of the raw material heavy-oxygen water is high, and the heavy-oxygen water after the reaction is collected in the storage device and can be reused.

In conclusion, the system provided by the present application has a simple structure, by adopting the heavy-oxygen water which has a wide source and low cost as an oxygen isotope source and utilizing the oxygen-exchange reaction, the replacement of oxygen-16 in normal carbon dioxide by oxygen-18 in heavy-oxygen water can be achieved to obtain the oxygen-18 labeled carbon dioxide product. The process is simple and pollution-free, the utilization rate of oxygen isotope is high, the conditions of separation and purification are mild, and the system has good economic benefits and application prospects.

The applicant declares that the above is only the embodiments of the present application, but the protection scope of the present application is not limited thereto. Those skilled in the art should understand that any change or replacement, which can be easily thought of by a person skilled in the art within the scope of the technology disclosed in the present application, shall fall within the protection scope and disclosure scope of the present application.

What is claimed is:

1. A system for preparing isotope-labeled carbon dioxide, comprising: a preparation unit, a raw material storage device for heavy-oxygen water, a raw material storage device for carbon dioxide, a product storage device, and a recovery and storage device for heavy-oxygen water;

the preparation unit comprises a heating vaporization device, an oxygen-exchange reaction device, and a gas-liquid separation device which are connected in sequence, and a catalytic material is arranged in the oxygen-exchange reaction device; the catalytic material comprises any one or a combination of at least two of $\gamma$-$Al_2O_3$, $CeO_2$, or anatase titanium dioxide;

an inlet of the heating vaporization device is connected to the raw material storage device for heavy-oxygen water and the raw material storage device for carbon dioxide, respectively;

a gas-phase outlet of the gas-liquid separation device is connected to the product storage device, and a liquid-phase outlet of the gas-liquid separation device is connected to the recovery and storage device for heavy-oxygen water.

2. The system according to claim 1, wherein the system comprises two or more preparation units, the inlet of the heating vaporization device in a next preparation unit is respectively connected to the raw material storage device for heavy-oxygen water and the gas-phase outlet of the gas-liquid separation device of a previous preparation unit along the flow direction of materials in the system.

3. The system according to claim 2, wherein the system comprises two or more preparation units, a heat-exchange device is further arranged between two adjacent preparation units;

a hot-medium inlet of the heat-exchange device is connected to an outlet of the oxygen-exchange reaction device in a next preparation unit along the flow direction of materials in the system;

a cold-medium inlet of the heat-exchange device is connected to a gas-phase outlet of the gas-liquid separation device in a previous preparation unit;

a hot-medium outlet of the heat-exchange device is connected to an inlet of the gas-liquid separation device in a next preparation unit;

a cold-medium outlet of the heat-exchange device is connected to an inlet of the heating vaporization device in a next preparation unit.

4. A preparation method for isotope-labeled carbon dioxide using the system according to claim 1, wherein the preparation method comprises the following steps:

(1) vaporizing heavy-oxygen water, and then mixing the heavy-oxygen water with carbon dioxide to obtain a mixed gas;

(2) catalyzing the mixed gas obtained in step (1) with a catalytic material to subject the heavy-oxygen water and the carbon dioxide to an oxygen-exchange reaction, wherein $^{16}O$ in the carbon dioxide is replaced by $^{18}O$ in the heavy-oxygen water to generate isotope-labeled carbon dioxide, and $^{18}O$ in the heavy-oxygen water is replaced by $^{16}O$; and (3) liquefying the heavy-oxygen water after the reaction, and subjecting the same and the carbon dioxide after the reaction to gas-liquid separation to obtain the isotope-labeled carbon dioxide.

5. The preparation method according to claim 4, wherein a molar ratio of the heavy-oxygen water to the carbon dioxide in step (1) is (2-5):1.

6. The preparation method according to claim 4, wherein the vaporization in step (1) is performed at a temperature of 100-300° C.

7. The preparation method according to claim 4, wherein the oxygen-exchange reaction in step (2) is performed at a volumetric space velocity of 5000-100000 $h^{-1}$.

8. The preparation method according to claim 4, wherein the liquefaction in step (3) is performed at a temperature of −10° C. to 20° C.

* * * * *